(Model.)
J. P. KESTNER.
FISH HOOK.
No. 422,226. Patented Feb. 25, 1890.
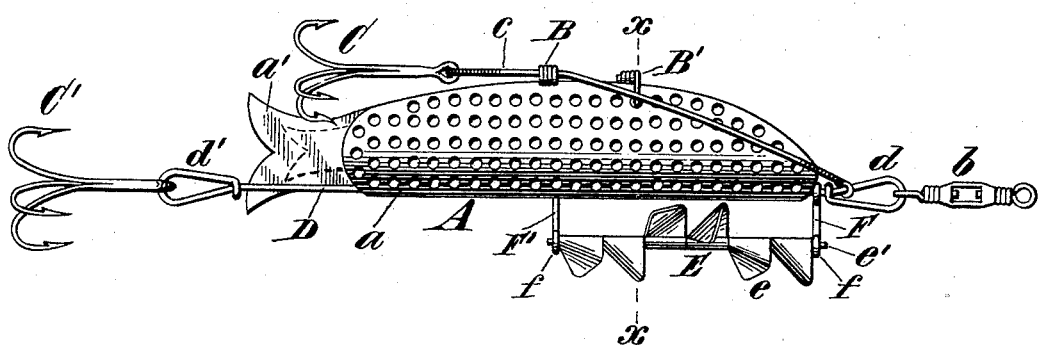
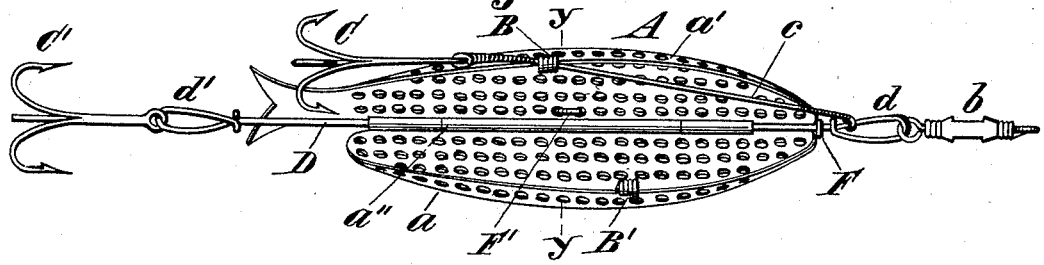
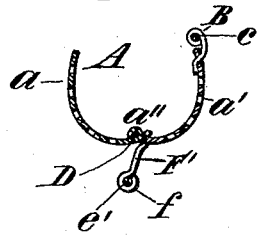
Attest
Frank C. Hattenhorn
Geo. H. Kestner
Inventor
John Phillip Kestner
by John E. Jones
his Attorney

UNITED STATES PATENT OFFICE.

JOHN PHILLIP KESTNER, OF CINCINNATI, OHIO.

FISH-HOOK.

SPECIFICATION forming part of Letters Patent No. 422,226, dated February 25, 1890.

Application filed October 16, 1889. Serial No. 327,229. (Model.)

*To all whom it may concern:*

Be it known that I, JOHN PHILLIP KESTNER, a citizen of the United States, residing at Cincinnati, in the county of Hamilton and State of Ohio, have invented a new and useful Improvement in Trolling-Hooks, of which the following is a specification.

My invention relates to an improvement in that class of trolling-hooks in which an imitation fish or decoy-bait is used, in connection with sharp insnaring-hooks, to catch fish, all of which will be fully described hereinafter, and particularly pointed out in the claims.

In the accompanying drawings, Figure 1 is a longitudinal elevation of my invention, showing it as it appears when in use; Fig. 2, a plan view of the same, showing the imitation fish (which is made hollow and in two parts hinged together) thrown open for the reception of the fishing-bait; Fig. 3, a transverse sectional elevation on line $x\ x$, Fig. 1, omitting the hooks and showing a minnow within the hollow decoy-fish; and Fig. 4, a transverse section, partly in elevation, on line $y\ y$, Fig. 2, also omitting said hooks.

A represents a hollow decoy or artificial bait made in imitation of a fish, and preferably of perforated sheet metal in two concavo-convex parts or members $a$ and $a'$, each a counterpart of the other and hinged or pivotally connected together at their lower voluted or tubular edges $a''$, so that they may be opened and closed to form an accessible receptacle for the fishing-bait.

B B' represent two ordinary spring-spirals suitably attached to the upper edges of the said members $a$ and $a'$, respectively, and forming fastening-clasps to hold the two members of the decoy closed.

I prefer to make member $a$ shorter than member $a'$ by omitting its tail end, as clearly shown in Figs 1 and 2, so that the tail of the live fishing-bait (within the decoy) may protrude through the small opening provided thereby, as shown in dotted lines in Fig. 1, and thus materially aid in attracting the fish or prey into the insnaring-hooks C C' adjacent thereto and in rear thereof.

D represents a longitudinal bar or wire lying within the lower tubular edges $a''$ of the two sides or members $a$ and $a'$ of the decoy and forming the hinging-shaft for said members. It projects outward beyond both ends of said decoy, and has loops or eyes $d\ d'$ formed at both its ends, an ordinary swivel $b$, for properly attaching the end of the trolling-line, being connected with loop $d$, and the hook C' engaging loop $d'$.

$c$ represents an ordinary snell attached at its fore end to said loop $d$, thence passing rearwardly through the spring-clasp B, which forms a suitable supporting-guide therefor at the middle of the decoy and receives and holds the hook C at its rear end.

E represents a suspension spinner or propeller composed of suitably-curved wings or vanes $e$, which are rigidly mounted on a horizontal shaft $e'$, and so disposed in relation to each other that they will rotate in unison when the device is drawn through the water in trolling. Both ends of spinner-shaft $e'$ are journaled in eyes $f$, formed at the lower ends of short vertical wires F F', which latter are suitably attached at their upper ends to the wire rod D and member $a'$, as clearly shown in Fig. 2.

In operating my trolling device I spread or throw the two perforated sides or members of the decoy A open on their hinges, as shown in Figs. 2 and 4, and then place between them the fishing-bait, which is preferably a live minnow slightly smaller than said decoy, with its tail projecting through the small opening at the rear, as above described. The said members are then closed and automatically fastened by means of the spiral spring-clasps, the said live bait being free to move within the hollow perforated decoy safe from attack by the surrounding prey attracted to it by the bright decoy and the senses of both scent and sight. The catching of said prey on the hooks C C' follows their betrayal by the decoy and bait, and is of course as usual in trolling.

It will be seen that live bait, or, in fact, bait of any kind, placed within the hollow decoy formed by the two perforated sides or members $a$ and $a'$ will not waste or be consumed, thereby prolonging its use just as long as possible, and in case live bait is used it will not suffer beyond the mere deprivation of its liberty, thus very materially enhancing the alluring qualities of the device.

The decoy is preferably made, as shown in the drawings and above stated, of sheet metal having perforations of a size sufficient to permit the free circulation of water through them and a sight and scent of the bait, but not large enough to permit the escape of or attack on said bait within the chamber formed by the hollowed sides of said decoy; but it is quite obvious that it may be made of wire-gauze or perforated open material of any kind, whereby a scent or sight, or both senses, may be secured by the prey on the bait within and form the main attraction or allurement for said prey without said bait being subjected to either suffering, waste, or attack. The metal forming the decoy may be highly polished and suitably decorated or painted in imitation of a fish, as usual, or instead of its being a likeness of a minnow or other fish it may be that of a reptile or other suitable enticement for the prey.

The longitudinal wire rod or bar D is preferably made straight, as shown, and forms the main stay of the entire device, as it receives all the strain brought to bear upon said device caused by any fish caught on the hooks, and provides a substantial support for the spinner which is suspended therefrom, and also a bearing-shaft for the two members $a$ and $a'$ to hinge upon.

The spinner suspended beneath the fore end of the decoy A serves to balance the device and hold it upright in the water, as shown in Fig. 1, and also forms an additional attraction for the prey on account of its rapid revolutions and soft movements in the water, thereby imitating the under fins of a minnow in motion.

I claim—

1. In a trolling device, a hollow perforated decoy or artificial fish A, formed in two parts $a$ and $a'$, hinged together at one of their respective edges and adapted to be opened and closed for inserting and containing the fishing-bait, substantially as herein set forth.

2. In a trolling device, a hollow perforated decoy A, formed in two divisions $a$ and $a'$, longitudinally hinged together so as to be readily opened and closed for the insertion and holding of the fishing-bait, in combination with a longitudinal wire draw-bar D and one or more insnaring-hooks, substantially as herein set forth.

3. In a trolling device, a hollow perforated decoy A, composed of two members $a$ and $a'$, hinged together so as to be opened and closed for the reception of the fishing-bait, in combination with a longitudinal draw and binding bar D, one or more insnaring-hooks, and a spinner or propeller E, substantially as herein set forth.

4. In a trolling device, a hollow perforated decoy A, formed in two hollowed parts $a$ and $a'$, hinged together at their lower longitudinal edges, and one being shorter than the other at its tail or rear end to provide a suitable opening for the outward projection of the tail of the live bait within said decoy, in combination with draw-bar D, snell $c$, one or more insnaring-hooks, and a spinner E, the latter being suspended from beneath the fore end of the decoy, and said draw-bar being a straight one with eyes or loops at both its ends for the attachment of the line-swivel, snell, and hooks, respectively, substantially as herein set forth.

5. In a trolling device, a hollow perforated decoy A, formed in two hollowed sections $a$ and $a'$, hinged together at their lower longitudinal edges, in combination with fastening-clasps B and B' on their upper free edges for holding them closed, the rear clasp forming a supporting-guide for a snell with a hook attached thereto, substantially as herein set forth.

In testimony of which invention I have hereunto set my hand.

JOHN PHILLIP KESTNER.

Witnesses:
JOHN E. JONES,
FRANK C. KATTENHORN.